(12) United States Patent
Lee et al.

(10) Patent No.: US 12,547,353 B2
(45) Date of Patent: Feb. 10, 2026

(54) SETTING PRINTING DATA TYPE

(71) Applicant: Hewlett-Packard Development Company, L.P., Spring, TX (US)

(72) Inventors: Sangmin Lee, Seongnam Si (KR); Junyoung Choi, Seongnam Si (KR); Woochul Shin, Seongnam Si (KR); Deokhee Boo, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 165 days.

(21) Appl. No.: 18/291,009

(22) PCT Filed: Dec. 30, 2021

(86) PCT No.: PCT/US2021/065615
§ 371 (c)(1),
(2) Date: Jan. 22, 2024

(87) PCT Pub. No.: WO2023/009160
PCT Pub. Date: Feb. 2, 2023

(65) Prior Publication Data
US 2024/0329892 A1  Oct. 3, 2024

(30) Foreign Application Priority Data
Jul. 28, 2021  (KR) .................. 10-2021-0099519

(51) Int. Cl.
*G06F 3/12*    (2006.01)
(52) U.S. Cl.
CPC .......... *G06F 3/1206* (2013.01); *G06F 3/1232* (2013.01); *G06F 3/1244* (2013.01); *G06F 3/1253* (2013.01); *G06F 3/126* (2013.01); *G06F 3/1288* (2013.01)

(58) Field of Classification Search
CPC ..... G06F 3/1206; G06F 3/1232; G06F 3/1244
See application file for complete search history.

(56) References Cited

U.S. PATENT DOCUMENTS

| 5,287,194 | A | * | 2/1994 | Lobiondo | ............. G06F 3/1282 |
| | | | | | 358/1.15 |
| 6,003,069 | A | | 12/1999 | Cavill | |
| 7,027,169 | B1 | * | 4/2006 | Morikawa | .............. G06K 15/00 |
| | | | | | 358/1.14 |
| 8,218,193 | B2 | | 7/2012 | Kim | |
| 2011/0211218 | A1 | | 9/2011 | Gilmore et al. | |
| 2017/0261334 | A1 | | 9/2017 | Lee et al. | |
| 2019/0279490 | A1 | | 9/2019 | Kitada et al. | |

FOREIGN PATENT DOCUMENTS

KR      10-0555636 B1    3/2006

* cited by examiner

*Primary Examiner* — Ibrahim Siddo
(74) *Attorney, Agent, or Firm* — Foley & Lardner LLP

(57) ABSTRACT

An example client device includes a communication unit, a user interface unit, a processor, and a memory to store instructions executable by the processor. The processor, by executing the instructions, is to receive a command for a remote print job through the user interface unit, detect the type of print data to be transmitted to a server based on print setting information in which a print option of the remote print job is set, generate print data for the remote print job according to the detected type, and transmit the print data to the server via the communication unit.

13 Claims, 13 Drawing Sheets

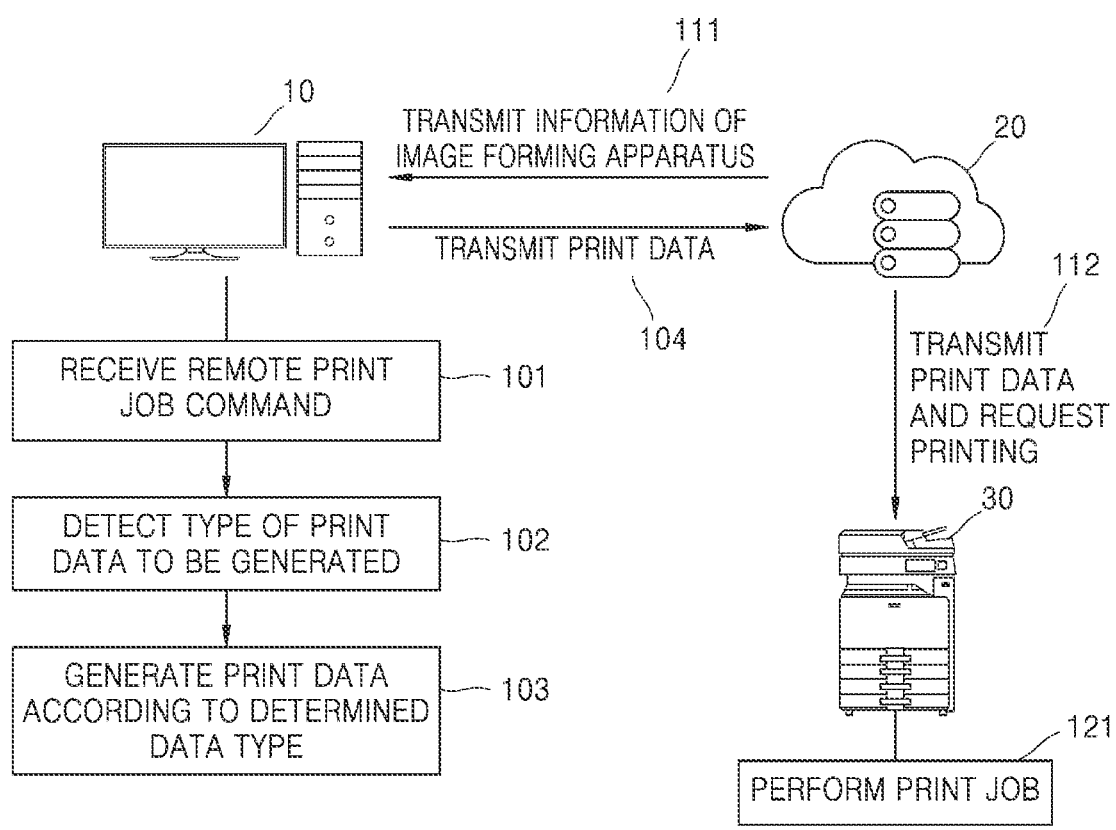

FIG. 8

```
<psf : Property name="ns0000 : NetworkID">
     <psf : Value xsi : type="xsd : string">ea335e5e</psf : Value>
</psf : Property>
<psf : Property name="ns0000 : SupportedPDL">                    810
     <psf : Value xsi : type="xsd : string">PCL5, PCL6, PDF</psf : Value>
</psf : Property>
```

FIG. 11

| NETWORK COST | FREE | | | PAID |
|---|---|---|---|---|
| NETWORK TRANSMISSION SPEED | TRANSMISSION SPEED > 100Mbp | | TRANSMISSION SPEED < 100Mbp | -- |
| NUMBER OF PRINT COPIES | NUMBER OF PRINT COPIES < 2 | NUMBER OF PRINT COPIES ≥ 2 | -- | -- |
| DATA TYPE | PCL3 | PDF | PDF | PDF |

SETTING PRINTING DATA TYPE

BACKGROUND

During a remote print job, a printer driver may receive data from an application and render the data in a certain data type. The rendered data may be passed to a server for a remote print job.

BRIEF DESCRIPTION OF THE DRAWINGS

Various examples will be described below by referring to the following figures.

FIG. 1 is a conceptual diagram illustrating an operation of a client device requesting an image forming apparatus to perform a remote print job through a server according to an example.

FIG. 8 is a view illustrating a printer ticket to store type information of print data transmitted to a server according to an example.

FIG. 11 is a view illustrating a process used to detect a type of print data according to an example.

DETAILED DESCRIPTION

Figure 2A:
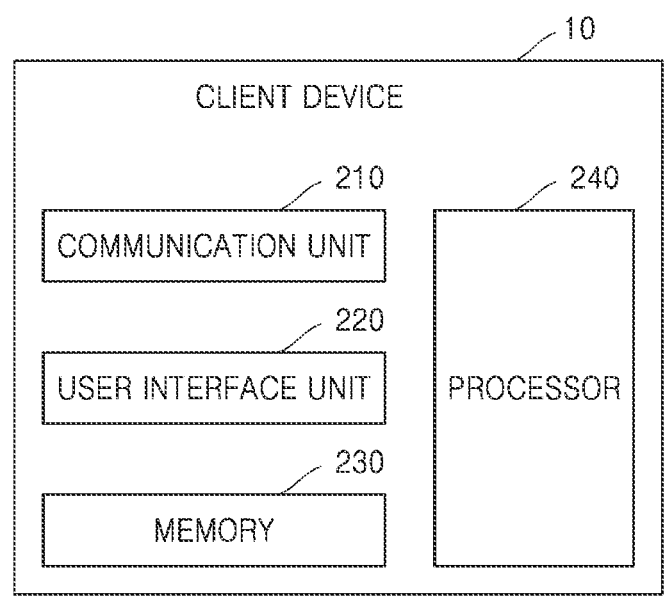
FIG. 2A is a block diagram illustrating a client device according to an example.

Below, a description will be given of examples of the disclosure with reference to the attached drawings. In this regard, examples of the present disclosure may have different forms and should not be construed as being limited to the descriptions set forth herein.

A "client device" may be an electronic device such as a computer, a desktop computer, a tablet, a cell phone, a notebook, a smartphone, a personal digital assistants (PDAs), and the like. The client device may be a device used by a user to request a remote print job. Based on a remote print job request for a document being received at the client device, the client device may transmit print data for the document to a server. For example, the document may be a document stored on the client device or a web page. The web page may be a web document on the Internet.

The "remote print job" may be a job of printing by an image forming apparatus in a network-connected environment. The remote print job may be a job in which print data processed by the client device is output from the image forming apparatus via the server. The image forming apparatus that performs the remote print job may be referred to as a cloud image forming apparatus or a remote image forming apparatus.

The "server" may be a device that is to control a remote print job. For example, the server may receive print data in response to a remote print job request from the client device, and transmit the print data to the image forming apparatus. The server may manage and store information about the image forming apparatus that is to perform a remote print job.

The "image forming apparatus" may be any apparatus capable of performing an image forming job, such as a printer, a copier, a scanner, a fax machine, a multi-function printer (MFP), or a display device. Further, the image forming apparatus may be a 2D image forming apparatus or a 3D image forming apparatus. The "image forming job performed by the image forming apparatus" may be a job related to printing, copying, scanning, faxing, storing, sending, coating, etc., or a combination of two or more of the above jobs.

"Print setting information" may include information about a print option to be applied during a remote print job in the image forming apparatus. The client device may provide a screen for setting a print option. For example, setting a print option may include setting at least one of an image forming apparatus to perform a print job, a color mode, duplex printing, a number of printed pages per sheet, a print quality, a number of print copies, a paper direction, a paper size, or the like.

"Network information" may include information about a communication network capable of transmitting data between a client device and an external device. For example, the network information may include at least one of a network transmission speed of the client device, network cost information, an Internet Protocol (IP) address, an IP address of a domain name system (DNS) server, a driver version of a network installed on the client device, a media access control (MAC) address, or the like.

"Information about the image forming apparatus" may include information about a data type supported by the image forming apparatus. The data type supported by the image forming apparatus may indicate a data type readable by the image forming apparatus. For example, the data type readable by the image forming apparatus may be a type of language expressing information about a page on which an image forming job is to be performed, and may be referred to as a page description language (PDL).

For example, a data type may refer to a type of data to be transmitted to a server. For example, a data type may be a type of data of a print job transmitted from a client device to a server. For example, a data type may include Portable Document Format (PDF), Printer Command Language (PCL), PostScript (PS), PCLm, XPS, and the like. For example, a data type may include at least one of a general data type generally readable by an electronic device other than an image forming apparatus or a data type readable by an image forming apparatus. For example, the general data type may be PDF or XPS. For example, the data type readable by an image forming apparatus may be PCL3, PCL5, or PCL6.

FIG. 1 is a conceptual diagram illustrating an operation of a client device requesting an image forming apparatus to perform a remote print job through a server according to an example.

Referring to FIG. 1, a client device 10 may request a remote print job for a document to an image forming apparatus 30 via a server 20. Based on print data being transmitted from the client device 10 to the server 20 in a first data type corresponding to a universal file format, the server 20 may render the print data into a second data type readable by the image forming apparatus 30. The server 20 may transmit the print data generated as the second data type to the image forming apparatus 30. The image forming apparatus 30 may perform a remote print job on a document based on the print data generated as the second data type. Based on the server 20 re-rendering print data rendered by the client device 10, a print quality may deteriorate. Accordingly, by transmitting print data generated in a data type readable by the image forming apparatus 30 in the client device 10 to the server 20, deterioration of a print quality may be prevented.

In addition, to improve the print quality, the client device 10, without the need to perform rendering on the server 20, may generate print data in a data type that can be directly printed by the image forming apparatus 30 and transmit the print data to the server 20. In this case, a size of the print data may be greater than a size of data generated in a universal file format. Therefore, based on a network transmission speed being low, a print job speed may be lowered, and based on the cost of the network being paid, the cost may be high due to an increase in network usage, such that it is desired to generate the size of the print data as small as possible.

In addition, a size of the print data may vary depending on a number of print copies included in a print option. Accordingly, because the size of print data in a situation in which the number of print copies is plural may be greater than the size of print data in a situation in which the number of print copies is single, it is desired to prevent a decrease in print job speed and an increase in network usage.

In other words, because the size of print data affects at least one of a print quality, a network usage cost, or a print job speed, the client device 10, without generating print data as a fixed data type, may dynamically detect the type of print data based on at least one of print setting information, network information, or information about the image forming apparatus 30.

For example, in operation 101, the client device 10 may receive a remote print job command for a document stored in the client device 10 or a document displayed on a web page. The client device 10 may provide a screen for setting a print option to be applied to a remote print job. The client device 10 may obtain print setting information based on information input on the screen for setting the print option. For example, the client device 10 may obtain print setting information based on the image forming apparatus 30 to perform a remote print job and an input for setting the number of print copies.

The client device 10 may transmit identification information about the image forming apparatus 30 to perform a remote print job to the server 20. In operation 111, the server 20 may obtain information about the image forming apparatus 30 including information about a data type supported by the image forming apparatus 30 based on the identification information about the image forming apparatus 30. The server 20 may transmit information about the image forming apparatus 30 to the client device 10.

In operation 102, the client device 10 may detect the type of print data to be generated based on at least one of the print setting information, network information, or information about the image forming apparatus 30. The client device 10 may detect a data type corresponding to the print setting information from among data types transmittable to the server 20. For example, the client device 10 may detect a data type corresponding to the print setting information, from among a general data type and data types readable by the image forming apparatus 30.

For example, based on the network transmission speed being low or the network cost being paid, the client device 10 may detect a PDF using a format of small-sized data as the data type. For example, based on the network transmission speed being high or the size of print job data being small, the client device 10 may detect, as the data type, PCL6, PCL3, PS, or the like having high-definition print quality.

In operation 103, the client device 10 may generate print data according to the detected data type. In operation 104, the client device 10 may transmit the print data to the server 20.

In operation 112, the server 20 may transmit the print data to the image forming apparatus 30 and request printing. In operation 121, the image forming apparatus 30 may perform a print job based on the print data.

FIG. 2A is a block diagram illustrating a client device according to an example.

Referring to FIG. 2A, the client device 10 may include a communication unit 210, a user interface unit 220, a memory 230, and a processor 240. However, the client device 10 may include more or fewer elements than the elements shown in the drawings. Hereinafter, examples of the elements will be described.

The communication unit 210 may communicate with an external device. As an example, the communication unit 210 may be connected to a network by a wired or wireless manner to communicate with an external device. The external device may be the server 20 or the image forming apparatus 30.

The user interface unit 220 may include an input unit to receive an input for controlling an operation of the client device 10 from a user and an output unit to display information such as a result according to an operation of the client device 10 or a status of the client device 10. For example, the user interface unit 220 may include an operation panel for receiving a user input, a display panel for displaying a screen, and the like.

In an example, the input unit may include a device to receive various types of user inputs, such as a keyboard, a physical button, a touch screen, a camera, a microphone, and the like. In addition, the output unit may include, for example, a display panel, a speaker, and the like. However, the disclosure is not limited thereto, and the user interface unit 220 may include a device supporting various inputs and outputs.

The memory 230 may store machine readable instructions or a program. For example, based on performing remote printing through the server 20, the memory 230 may store a program including instructions for an operating method of the client device 10 that detects a data type to be transmitted to the server 20 based on print setting information, generates print data according to the detected type, and transmits the print data to the server 20.

The memory 230 may include at least one type of storage medium from among memory of a flash memory type, a hard disk type, a multimedia card micro type or a card type (e.g., SD or XD memory), random access memory (RAM), static random access memory (SRAM), read-only memory (ROM), electrically erasable programmable ROM (EEPROM), programmable ROM (PROM), magnetic memory, a magnetic disk, an optical disk, and the like.

For example, the memory 230 may store information used to detect the type of print data. For example, the memory 230 may store network information and information about the image forming apparatus 30.

The processor 240 may control an operation of the image forming apparatus 30, and may include at least one processor, such as a central processing unit (CPU). The processor 240 may include at least one processor specialized for each function or may be an integrated processor.

The processor 240 may execute a program stored in the memory 230, read data or a file stored in the memory 230, or store new data or a file in the memory 230. The processor 240 may execute instructions stored in the memory 230 to detect the type of print data based on print setting information, network information, and information about the image forming apparatus 30.

The processor 240 may receive a command for a remote print job through the user interface unit 220. For example, the processor 240 may execute an application installed in the client device 10. For example, the application may be machine readable instructions capable of opening, storing, printing, sharing, and editing a certain document. For example, the user interface unit 220 may receive a remote print job command of a certain document based on a user interface provided by the application.

The processor 240 may detect the type of print data of a print job transmitted from the client device 10 to the server 20 based on print setting information in which a print option for a remote print job is set. For example, setting a print option may include setting at least one of the image forming apparatus 30, a color mode, duplex printing, a number of printed pages per sheet, a print quality, a number of print copies, a paper direction, a paper size, or the like. For example, possible data types of the print job transmitted from the client device 10 to the server 20 may include at least one of PDF, PS, PCL, PCLm, or XPS. For example, a data type may include at least one of a general data type or a data type readable by an image forming apparatus. For example, the general data type may be PDF or XPS. For example, the data readable by an image forming apparatus may be PCL3, PCL5, or PCL6. For example, the processor 240 may detect one of a general data type and a data type readable by an image forming apparatus to be a data type to be transmitted to the server 20 based on the print setting information.

For example, the processor 240 may detect the type of print data to be transmitted to the server 20 based on the number of print copies set as a print option. For example, the processor 240 may detect a certain data type from among a plurality of data types based on the number of print copies. The plurality of data types may be a data type supported by the image forming apparatus 30 to perform a remote print job and a general data type. For example, the data type supported by the image forming apparatus 30 may vary according to a model of the image forming apparatus 30.

As an example, based on the number of print copies being plural, the processor 240 may detect the type of print data to be a type that generates a preset small amount of data. For example, the type that generates a preset small amount of data may be a type that generates a small amount of data for the same document from among a plurality of data types. For example, it is assumed that the plurality of data types are PDF and PCL3. The size of data of PDF generated for the same document may be less than the size of data of PCL3. In that case, PDF may be set to a type that generates a small amount of data. For example, based on the number of print copies being plural, because the size of data for a certain document may be greater than the size of data based on the number of print copies being singular, the processor 240 may prevent the size of the print data from increasing by detecting the type of print data to be a type that generates a preset small amount of data. In this case, the processor 240 may detect the type of print data to be PDF. In addition, based on the number of print copies being singular, the processor 240 may detect the type of print data to be a type corresponding to a preset high quality. In this case, the processor 240 may detect the type of print data to be PCL3.

For example, it is assumed that a data type used in general is PDF, and that a data type supported by the image forming apparatus 30 is PCL3. The size of data generated according to PDF may be smaller than the size of data generated according to PCL3. In addition, the quality of PDL data generated by re-rendering PDF in a server may be lower than that of data generated according to PCL3. For example, based on the number of print copies being plural, the processor 240 may detect the type of print data to be PDF. On the other hand, based on the number of print copies being singular, the processor 240 may detect the type of print data to be PCL3.

For example, the processor 240 may calculate a size of remote print job data based on print setting information of a remote print job. For example, the processor 240 may calculate a size of print job data based on a number of print copies included in the print setting information. Accordingly, the larger the number of print copies, the larger the size of the print job data may be. As another example, the processor 240 may calculate the size of the print job data based on a print quality included in the print setting information. Therefore, the higher the print quality, the larger the size of the print job data. The processor 240 may detect the type of print data to be transmitted to the server 20 based on the size of the print job data. For example, based on the size of the print job data for a remote print job being smaller than a preset size, the processor 240 may detect the type of print data to be transmitted to the server to be a high quality type. As another example, based on the size of the print job data for a remote print job being larger than a preset size, the processor 240 may detect the type of print data to be transmitted to the server to be a type that generates a preset small amount of data.

For example, the processor 240 may obtain network information including at least one of a network transmission speed or network cost information of the client device 10. The processor 240 may detect the type of print data to be transmitted to the server 20 based on the network information or the print setting information.

As an example, based on the network transmission speed being greater than a preset speed, or the size of the print job data for a remote print job being smaller than a preset size, the processor 240 may detect the type of print data to be transmitted to the server to be a high quality type.

In addition, based on the network transmission speed being less than a preset speed, a network usage fee being paid, or the size of the print job data for a remote print job being larger than a preset size, the processor 240 may detect the type of print data to be transmitted to the server to be a type that generates a preset small amount of data.

For example, the processor 240 may detect the type of print data to be transmitted to the server 20 based on at least one of print setting information in which a print option is set, network information of the client device 10, or information about the image forming apparatus 30. For example, the information about the image forming apparatus 30 may include information about a data type supported by the image forming apparatus 30.

For example, the processor 240 may receive, through the user interface unit 220, an input for setting a priority for at least one of a size of print data or a print quality. The processor 240 may detect the type of print data to be transmitted to the server 20 based on the received priority. For example, based on the priority of the size of print data being higher than the priority of the print quality, the processor 240 may detect the type of print data to be transmitted to the server to be a type that generates a preset small amount of data. For example, based on the priority of the print quality being higher than that of the size of print data, the processor 240 may detect the type of print data to be transmitted to the server to be a type corresponding to high quality.

The processor 240 may generate print data for a document according to the detected type. For example, based on the number of print copies being plural, the processor 240 may generate print data in a type that generates a preset small amount of data for the first number of print copies of a remote print job. The processor 240 may transmit the print data to the server 20 through the communication unit 210.

Figure 2B:
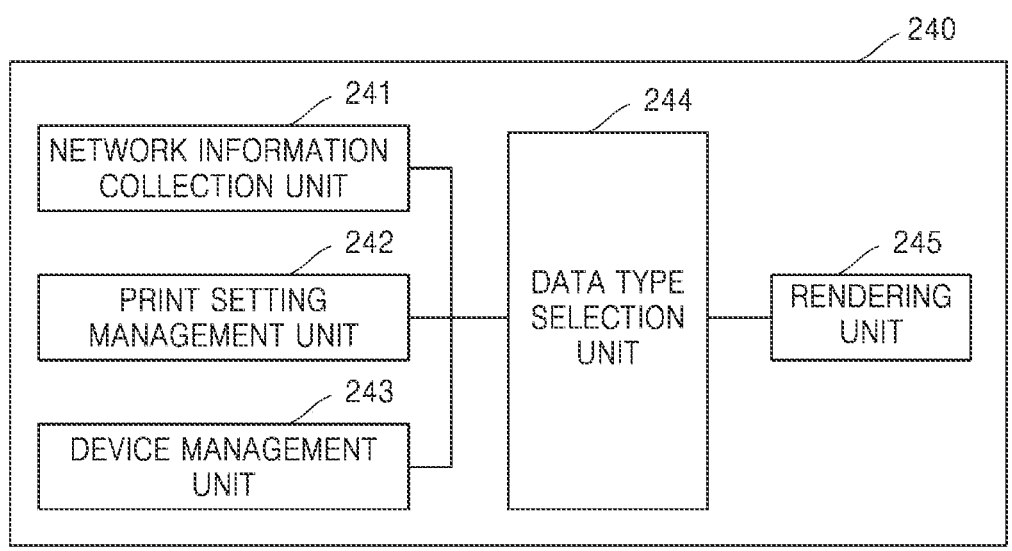
FIG. 2B is a block diagram illustrating a processor of a client device according to an example.

FIG. 2B is a block diagram illustrating a processor of a client device according to an example.

Referring to FIG. 2B, the processor 240 in the client device 10 may include a network information collection unit 241, a print setting management unit 242, a device management unit 243, a data type selection unit 244, and a rendering unit 245. However, the processor 240 in the client device 10 may be include more or fewer elements than the elements shown in the drawings. Hereinafter, example elements will be described.

For example, the network information collection unit 241 may collect network information through an application programming interface (API) provided by an operating system of the client device 10. For example, based on a network connection event occurring in the client device 10, the network information collection unit 241 may collect network information of a network connected to the client device 10. In addition, based on a remote print job request being received from the client device 10, the network information collection unit 241 may collect network information.

For example, the network information collection unit 241 may collect network information including at least one of a network transmission speed or network cost information of the client device 10. For example, the network transmission speed may be a transmission speed of data transmitted from the client device 10 to an external device and a reception speed of data received from an external device. For example, the network cost information may be information about a network usage fee. For example, the network cost information may refer to information indicating whether the use of the network is free or paid. In addition, based on a network usage fee being paid, the network cost information may include at least one of a cost based on data usage or a cost based on a network usage time.

Furthermore, the network information may include at least one of an IP address, a MAC address of a gateway, a network name, or the like.

For example, the network information collection unit 241 may store the network information in a storage accessible to a printer driver.

For example, the print setting management unit 242 may obtain information about a print option included in print setting information. For example, the print setting management unit 242 may obtain information about a number of print copies included in the print option.

For example, the device management unit 243 may collect information about the image forming apparatus 30 to perform a remote print job. For example, the device management unit 243 may transmit identification information about the image forming apparatus 30 to the server 20 through a communication unit. The device management unit 243 may receive information about the image forming apparatus 30 from the server 20 through a communication unit. The information about the image forming apparatus 30 may include information about a data type supported by the image forming apparatus 30. In addition, the information about the image forming apparatus 30 may include specification information about the image forming apparatus 30. The device management unit 243 may store information about the image forming apparatus 30 in a storage accessible to a printer driver.

For example, the data type selection unit 244 may obtain a printer ticket including print setting information, network information, and information about the image forming apparatus 30. For example, a printer ticket may be generated by a printer driver. The data type selection unit 244 may detect a data type of a document for which a remote print job is requested based on at least one of print setting information, network information, or information about the image forming apparatus 30. For example, the data type selection unit 244 may detect the type of print data based on an operation for detecting the type of print data to be transmitted to a server. For example, the operation for detecting the type of print data may be an operation for detecting the type of print data to be transmitted from the client device 10 to the server 20 based on at least one of print setting information or network information. For example, the operation for detecting the type of print data may be an operation for detecting a certain data type from among a general data type and data types supported by the image forming apparatus 30. For example, the operation for detecting the type of print data may be an operation for detecting the type of print data that satisfies at least one of a print quality, a cost, or a print job speed, based on at least one of print setting information or network information. For example, the operation for detecting the type of print data may be preset by a user. For example, the data type selection unit 244 may obtain priority information about a parameter used to detect the type of print data. The data type selection unit 244 may select the type of print data according to the priority information about the parameter. For example, the parameter may be the size of data, a print quality, and the like.

For example, the data type selection unit 244 may detect a priority of the size of a print job and a print quality for each type of data supported by the image forming apparatus 30. The data type selection unit 244 may select a data type corresponding to the size of requested print data, based on the priority of at least one of the size of a print job or a print quality.

For example, a data type supported by the image forming apparatus 30 may be PCL3, PCL6, PS, or PCLm. In addition, a general data type transmitted to the server 20 may be PDF. For example, a size order of average print job data may be PDF<PCL6<PS<PCL3<PCLm. For example, based on a small size of print data being desired, the data type selection unit 244 may select PDF as a data type. For example, the priority of the print quality may be PS>PCL6>PCL3>PCLm>PDF. For example, based on high-quality printing being desired, the data type selection unit 244 may select PS as the type of print data.

For example, the data type selection unit 244 may detect the type of print data based on print setting information and information about the image forming apparatus 30. As an example, in a situation in which the number of print copies is 3, the size of print job data may be three times larger than in a situation in which the number of print copies is 1. Therefore, based on the number of print copies included in the print setting information being plural, the data type selection unit 244 may select a data type that generates a preset small amount of data from among a plurality of data types. On the other hand, based on the number of print copies being singular, the data type selection unit 244 may select a data type corresponding to high quality from among a plurality of data types.

For example, the data type selection unit 244 may detect the type of print data based on network information and information about the image forming apparatus 30. For example, based on a network transmission speed being less than a preset speed, or a network usage fee being paid, the data type selection unit 244 may select a data type that generates a preset small amount of data from among a plurality of data types. As another example, based on the network transmission speed being greater than the preset speed, or the network being free of cost, the data type selection unit 244 may select a data type corresponding to high quality from among a plurality of data types.

For example, the data type selection unit 244 may detect the type of print data based on print setting information, network information, and information about the image forming apparatus 30. For example, even if a network transmission speed is greater than a preset speed, based on a network usage fee being paid, the data type selection unit 244 may select a data type that generates a preset small amount of data from among a plurality of data types. As another example, even if the network transmission speed is less than the preset speed, based on the network being free of cost, the data type selection unit 244 may select a data type corresponding to high quality from among a plurality of data types.

For example, the data type selection unit 244 may transmit information about a detected data type to the rendering unit 245. The rendering unit 245 may generate print data for a document according to the detected data type. The rendering unit 245 may transmit print data to the server 20 through a communication unit.

Figure 3:
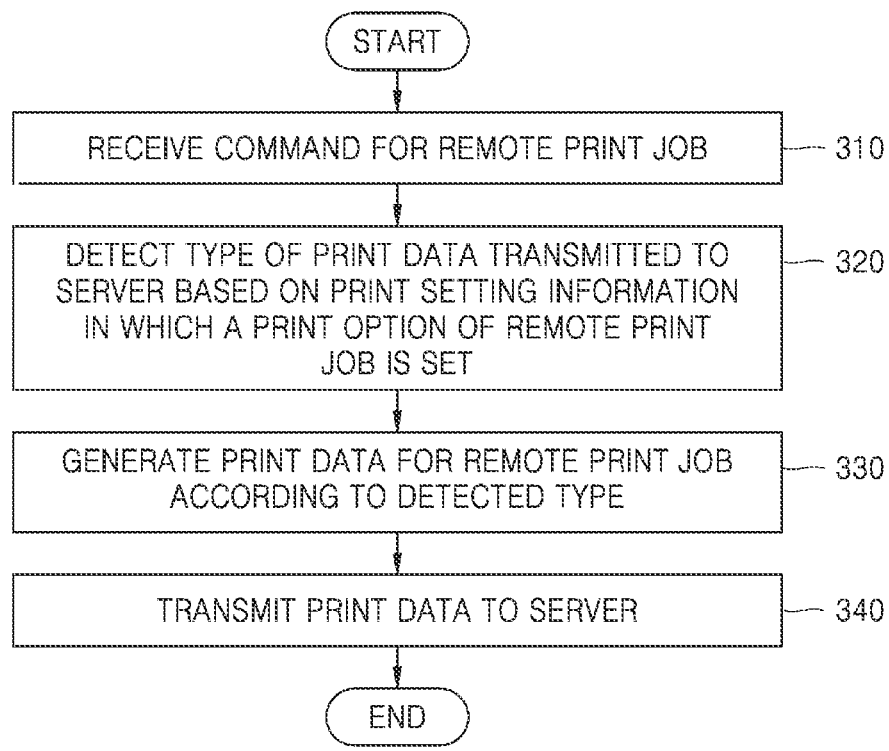
FIG. 3 is a flowchart illustrating an operation method of a client device to generate print data and transmit the print data to a server according to an example.

FIG. 3 is a flowchart illustrating an operation method of a client device to generate print data and transmit the print data to a server according to an example.

Referring to FIG. 3, the client device 10 may receive a command for a remote print job in operation 310. For example, the client device 10 may execute an application and retrieve a document from within the application. As another example, the client device 10 may receive a command for a remote print job for a document disclosed in a web page.

In operation 320, the client device 10 may detect the type of print data to be transmitted to the server 20 based on print setting information in which a print option of the remote print job is set.

For example, the client device 10 may receive an input for setting a print option based on a screen for setting a print option provided from a print driver. The client device 10 may obtain print setting information based on the input for setting the print option.

For example, the client device 10 may detect the type of print data to be transmitted to the server 20 based on the number of print copies included in the print option. For example, a data type to be transmitted to the server 20 may include at least one of a general data type or a data type readable by an image forming apparatus. For example, the general data type may be PDF, and the data type readable by an image forming apparatus may include at least one of PS, PCL3, PCL6, or PCLm.

As an example, based on the number of print copies being plural, as the size of the print data increases, a print job speed may be lowered or a network usage may increase. In that case, the client device 10 may detect the type of print data to be a type that generates a preset small amount of data. As another example, based on the number of print copies being singular, the client device 10 may detect the type of print data to be a type corresponding to a preset high quality.

For example, the client device 10 may calculate the size of remote print job data based on print setting information. The client device 10 may detect the type of print data to be transmitted to the server 20 based on the size of print job data.

For example, the client device 10 may obtain network information including at least one of a network transmission speed or network cost information of the client device 10. The client device 10 may detect the type of print data to be transmitted to the server 20 based on network information and print setting information.

As an example, based on the network transmission speed being greater than a preset speed, or the size of print job data for a document being smaller than a preset size, the client device 10 may detect the type of print data to be a high quality type.

In addition, based on the network transmission speed being less than a preset speed, a network usage fee being paid, or the size of the print job data being larger than a preset size, the client device 10 may detect the type of print data to be a type that generates a preset small amount of data.

For example, the client device 10 may detect the type of print data to be transmitted to the server 20 based on at least one of print setting information in which a print option is set, network information of the client device 10, or information about the image forming apparatus 30. For example, the information about the image forming apparatus 30 may include information about a data type supported by the image forming apparatus 30.

For example, the client device 10 may receive an input for setting a priority for at least one of the size of print data or the print quality. The client device 10 may detect the type of print data to be transmitted to the server 20 based on the received priority.

In operation 330, the client device 10 may generate print data for a remote print job according to the detected type. For example, based on the number of print copies being plural, the client device 10 may generate print data in a type that generates a preset small amount of data for the first number of print copies of a remote print job. For example, in a situation in which the number of print copies is 10, the client device 10 may generate print data as PDF for the first number of print copies, and may transmit information about the number of print copies to the server 20.

In operation 340, the client device 10 may transmit the print data to the server 20. The server 20 may transmit the print data to the image forming apparatus 30 and request a remote print job.

Figure 4:
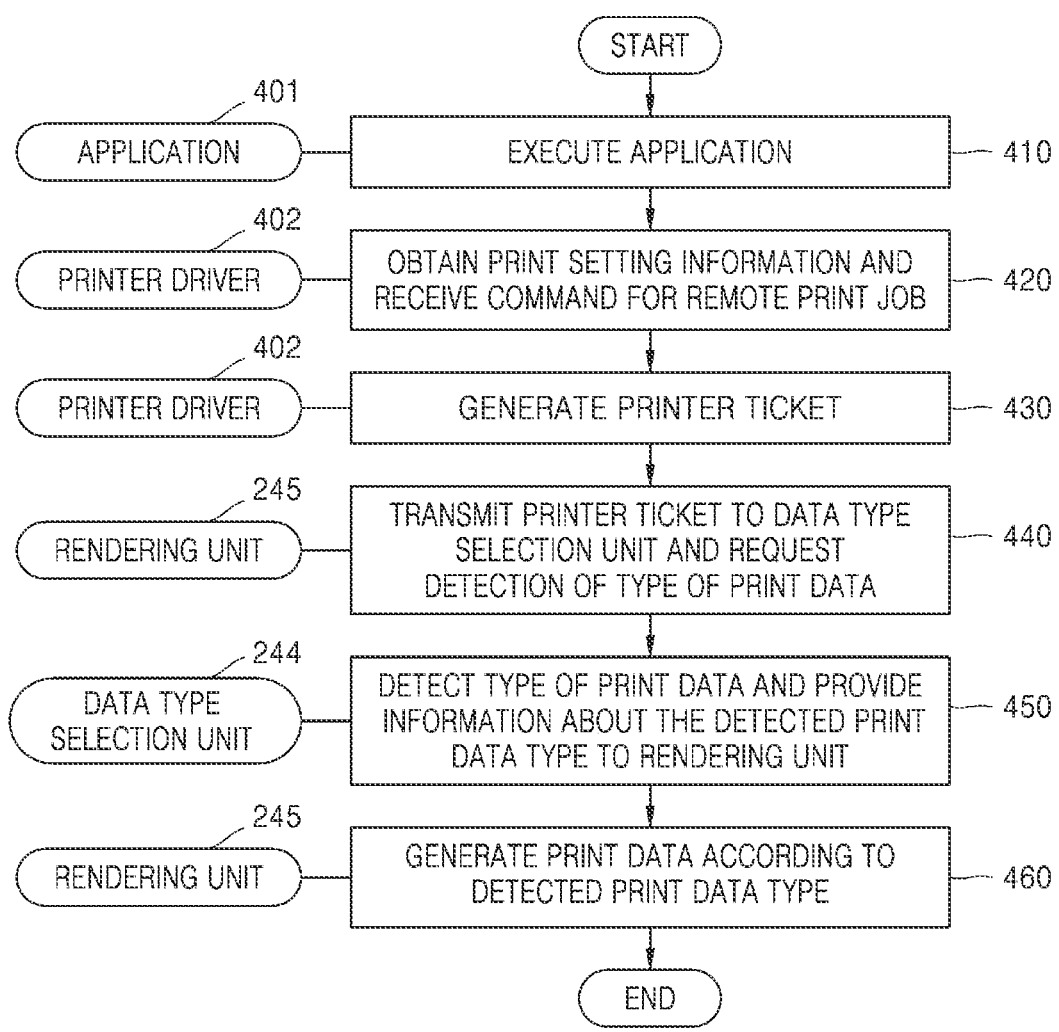
FIG. 4 is a flowchart illustrating an operation method of a client device to generate print data according to an example.

FIG. 4 is a flowchart illustrating an operation method of a client device to generate print data according to an example.

Referring to FIG. 4, an application 401 may be executed in the client device 10 in operation 410. The application 401 may include machine readable instructions that allow a user to open, store, print, share, and edit a certain document. The application 401 may call a printer driver 402 to set a print option.

In operation 420, the printer driver 402 may obtain print setting information in which a print option for a remote print job is set and receive a command for the remote print job. For example, the printer driver 402 may receive an input for selecting the image forming apparatus 30 to perform a remote print job. For example, the printer driver 402 may provide a screen for setting a print option and obtain print setting information based on the print option input from the screen. For example, a screen for setting a print option may be provided through the application 401.

In operation 430, the printer driver 402 may generate a printer ticket. The printer driver 402 may obtain network information and information about the image forming apparatus 30 from a memory. The network information and information about the image forming apparatus 30 may be stored in a certain storage in the memory. The printer driver 402 may generate a printer ticket including the print setting information, the network information, and the information about the image forming apparatus 30. The printer driver 402 may transmit the generated printer ticket to the rendering unit 245.

In operation 440, the rendering unit 245 may transmit the printer ticket to the data type selection unit 244 and request detection of the type of print data.

In operation 450, the data type selection unit 244 may detect the type of print data based on information included in the printer ticket. The data type selection unit 244 may provide information about the detected print data type to the rendering unit 245.

In operation 460, the rendering unit 245 may generate print data for a remote print job according to the detected print data type. The rendering unit 245 may transmit the print data to the server 20 through a communication unit.

Figure 5:
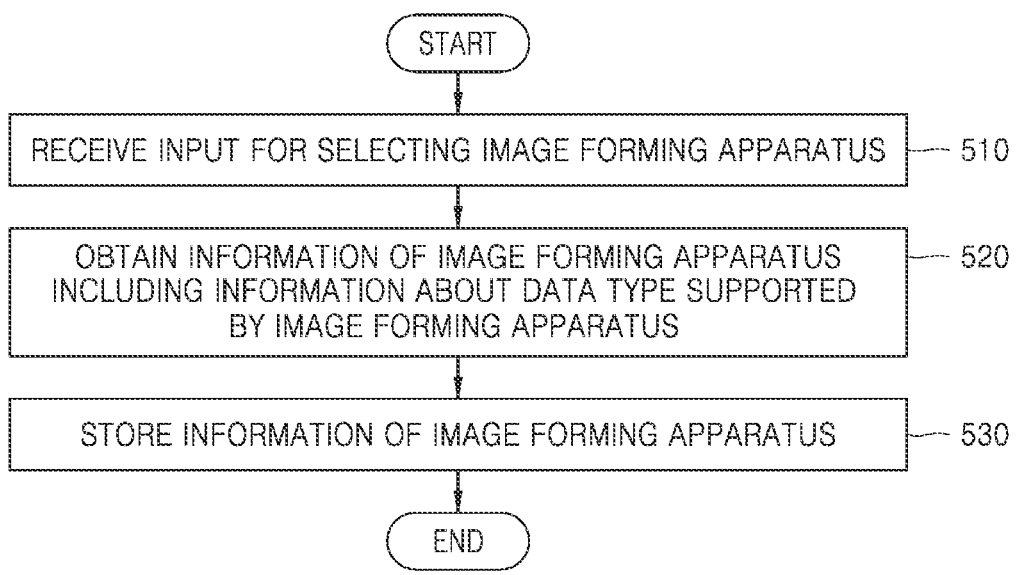
FIG. 5 is a flowchart illustrating an operation method of a client device to store information about an image forming apparatus according to an example.

FIG. 5 is a flowchart illustrating an operation method of a client device to store information about an image forming apparatus according to an example.

Referring to FIG. 5, the client device 10 may receive an input for selecting the image forming apparatus 30 in operation 510. For example, the client device 10 may display a list of a plurality of image forming apparatuses capable of performing a remote print job on a screen for setting a print option. The client device 10 may receive an input for selecting the image forming apparatus 30 from the list.

In operation 520, the client device 10 may obtain information about the image forming apparatus 30 including information about a data type supported by the image forming apparatus 30. For example, the client device 10 may receive, from the server 20, information about the image forming apparatus 30 including information about a data type supported by the selected image forming apparatus 30.

In operation 530, the client device 10 may store information about the image forming apparatus 30 in a memory. For example, the client device 10 may store information about the image forming apparatus 30 in a storage accessible to a printer driver.

Figure 6:
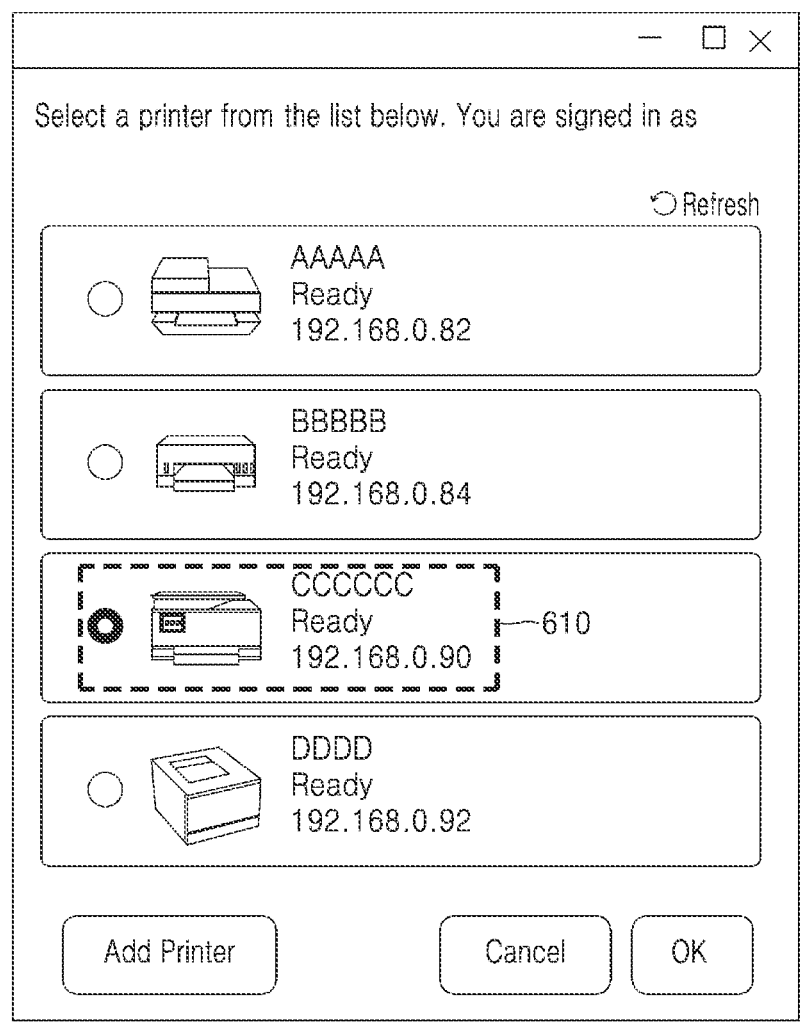
FIG. 6 is a view illustrating a process of selecting an image forming apparatus using a client device according to an example.

FIG. 6 is a view illustrating a process of selecting an image forming apparatus using a client device according to an example.

Referring to FIG. 6, the client device 10 may display a list of a plurality of image forming apparatuses. For example, an application may be executed within the client device 10. The application may display a screen to set a print option for a remote print job. A menu for selecting the image forming apparatus 30 may be provided on the screen for setting the print option. For example, based on a menu for selecting the image forming apparatus 30 to request a remote print job being executed, the client device 10 may display the list of the plurality of image forming apparatuses.

As shown in FIG. 6, the list may include information about the image forming apparatus 30 to request a remote print job from the client device 10. For example, the information about the image forming apparatus 30 may include at least one of model information about the image forming apparatus 30, state information about the image forming apparatus 30, IP address information about the image forming apparatus 30, or the like.

For example, the client device 10 may receive an input for selecting an image forming apparatus 610 having "CCCCCC" model information from among the plurality of image forming apparatuses. The client device 10 may receive information about the image forming apparatus 610 from the server 20 through a device management unit. For example, the information about the image forming apparatus 610 may include information about a data type readable by the image forming apparatus 610.

Figure 7:
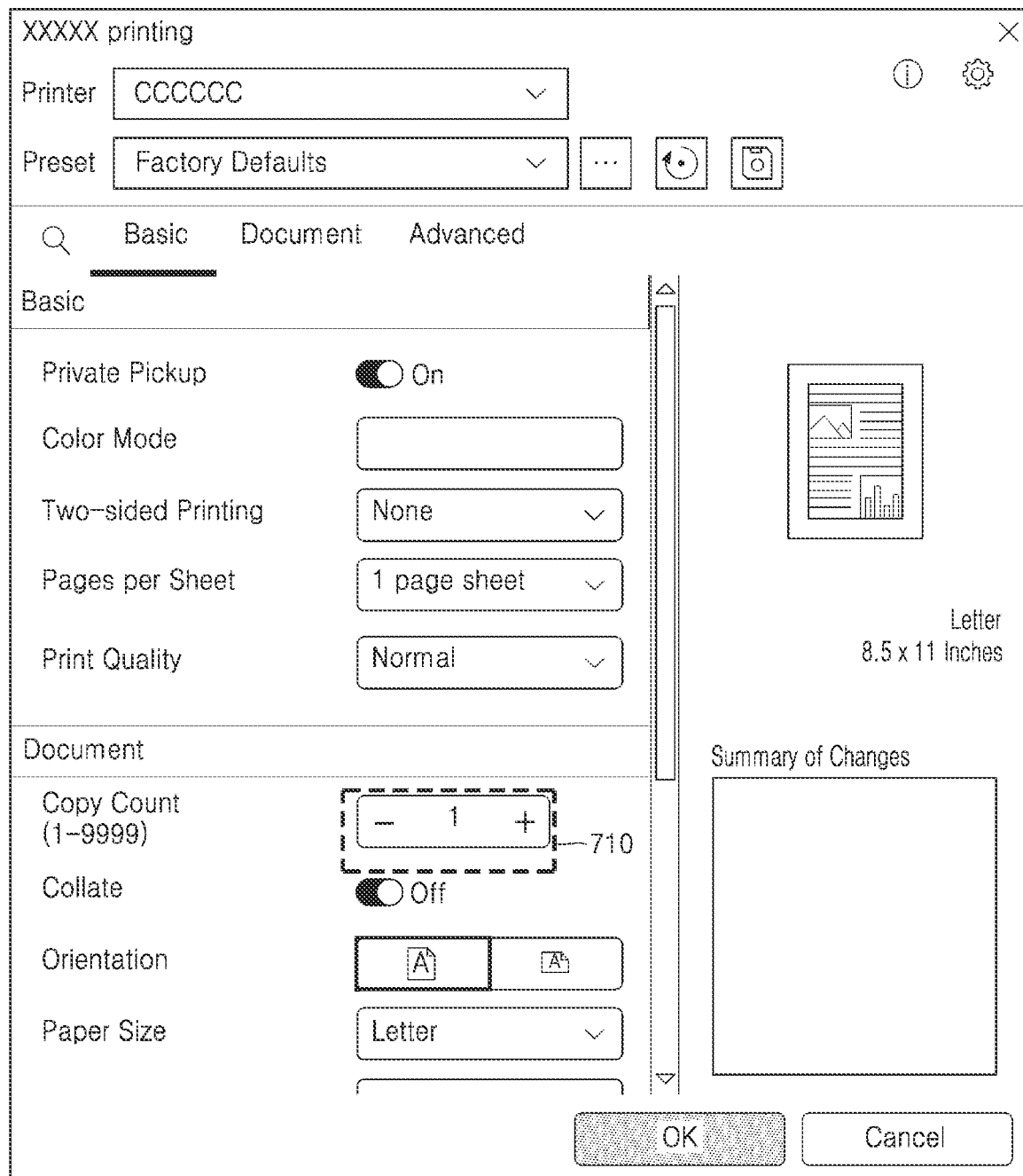
FIG. 7 is a view illustrating a process of setting a print option in a client device according to an example.

FIG. 7 is a view illustrating a process of setting a print option in a client device according to an example.

Referring to FIG. 7, the client device 10 may display a screen for setting a print option. For example, on the screen for setting the print option, a user interface for setting at least one of the image forming apparatus 30, a color mode, duplex printing, a number of printed pages per sheet, a print quality, a number of print copies, a paper direction, a paper size, or the like may be provided.

For example, print setting information in which a print option is set may be used to detect the type of print data to be transmitted to the image forming apparatus 30 selected to perform a remote print job. For example, the client device 10 may detect a certain data type from among a plurality of data types based on print setting information in which a print option is set. For example, the plurality of data types may include a general data type and data types readable by an image forming apparatus.

FIG. 8 is a view illustrating a printer ticket to store type information of print data to be transmitted to a server according to an example.

Referring to FIG. 8, a data type to be transmitted to the server 20 may be different according to the model of the image forming apparatus 30. Accordingly, for each image forming apparatus 30, data types supported by the image forming apparatus 30 and the number of data types may be different. Based on print data being generated in a data type that is not supported by the image forming apparatus 30, the image forming apparatus 30 cannot read the print data. Accordingly, the client device 10 may select a data type corresponding to a condition obtained from print setting information and network information, from among a plurality of data types including data types supported by the image forming apparatus 30 for requesting a remote print job and a general data type.

A data type selection unit in the client device 10 may select the type of print data based on the printer ticket. The printer ticket may include print setting information, network information, and information about the image forming apparatus 30. For example, the information about the image forming apparatus 30 may include information about a data type of data supported by the image forming apparatus 30. As shown in FIG. 8, the printer ticket may include data type information 810 including a data type supported by the image forming apparatus 30 and a general data type to be transmitted to a server. For example, referring to FIG. 8, the data type supported by the image forming apparatus 30 may be PCL5 and PCL6, and the general data type may be PDF.

Figure 9:
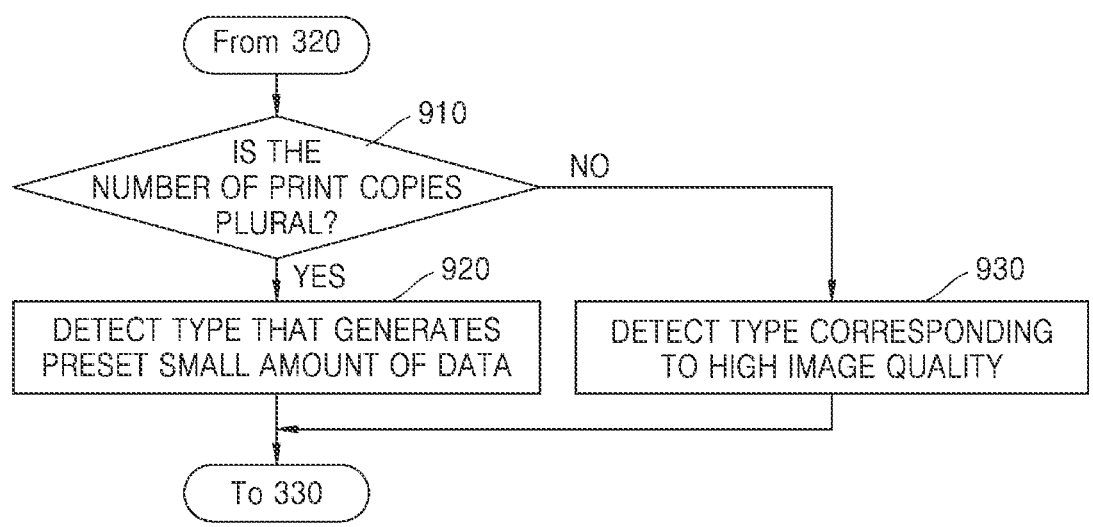
FIG. 9 is a flowchart illustrating an operation method of a client device to detect a type of print data based on print setting information according to an example.

FIG. 9 is a flowchart illustrating an operation method of a client device to detect a type of print data based on print setting information according to an example.

Referring to FIG. 9, the client device 10 may detect whether the number of print copies set in a print option included in print setting information is plural in operation 910.

Based on the number of print copies being plural, in operation 920, the client device 10 may detect the type of print data to be a type that generates a preset small amount of data. For example, the type of print data to be transmitted from the client device 10 to the server 20 may include at least one of a general data type or a data type readable by an image forming apparatus. For example, the general data type may be PDF, and a data type supported by the image forming apparatus may be PCL3. Because the size of print data based on the number of print copies being plural may be larger than the size of print data based on the number of print copies being singular, in a situation in which the number of print copies is plural, print data of a small size may be used. Accordingly, the client device 10 may detect PDF as a data type from among a plurality of data types.

On the other hand, in a situation in which the number of print copies is singular, in operation 930, the client device 10 may detect the type of print data to be a type corresponding to high image quality. For example, based on the number of print copies being singular, the client device 10 may select a data type having high print quality from among a plurality of data types as the type of print data to be transmitted to the server 20.

Once the data type is detected, the client device 10 may generate print data to be transmitted to the server 20 in the detected print data type according to operation 330.

Figure 10:
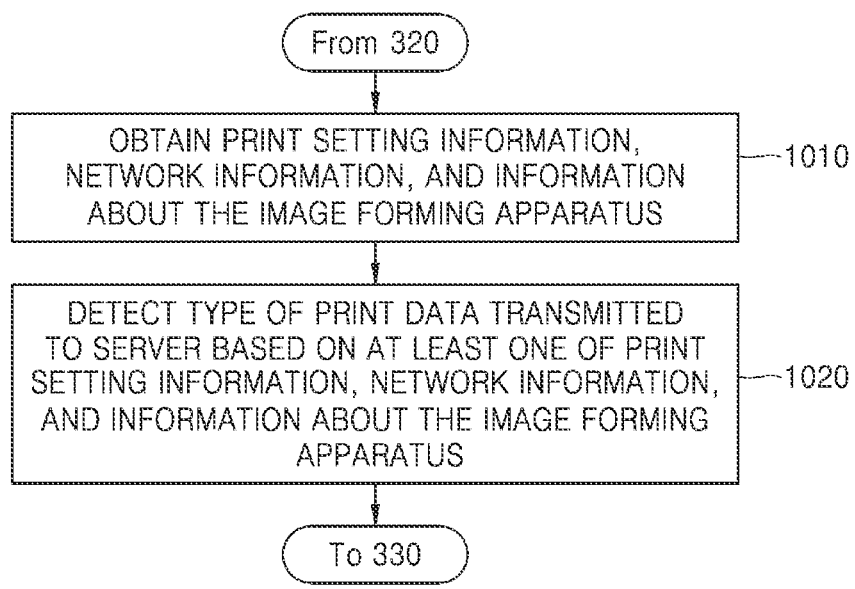
FIG. 10 is a flowchart illustrating an operation method of a client device to detect a type of print data based on at least one of print setting information, network information, or information about an image forming apparatus according to an example.

FIG. 10 is a flowchart illustrating an operation method of a client device to detect a type of print data based on at least one of print setting information, network information, or information about the image forming apparatus according to an example.

Referring to FIG. 10, the client device 10 may obtain the print setting information, network information, and information about the image forming apparatus 30 in operation 1010. For example, the client device 10 may obtain print setting information from information input from a screen for setting a print option. For example, the client device 10 may obtain the network information through an API provided by an operating system. For example, the client device 10 may receive information about the image forming apparatus 30 to perform a remote print job from the server 20.

In operation 1020, the client device 10 may detect the type of print data to be transmitted to the server 20 based on at least one of the print setting information, network informa-tion, or information about the image forming apparatus 30. An example process of detecting the type of print data will be described with reference to FIG. 11.

FIG. 11 is a view illustrating a process used to detect a type of print data according to an example.

Referring to FIG. 11, print setting information, network information, and information about the image forming apparatus 30 may be used to detect the type of print data. For example, a parameter as a criterion for detecting the type of print data may be a network usage fee, a network transmission speed, or the number of print copies. The type of print data may be detected to be one of a general data type and data types supported by the image forming apparatus 30. When print data is generated in the detected data type, the image forming apparatus 30 may read the print data and perform a print job according to a result of the reading.

Referring to FIG. 11, the client device 10 may detect the type of print data based on the network usage fee, the network transmission speed, and the number of print copies. For example, the client device 10 may detect a priority of at least one of the size of a print job or a print quality for each type of data supported by the image forming apparatus 30. The client device 10 may select a data type corresponding to the size of requested print data, based on the priority of at least one of the size of a print job or a print quality.

For example, a data type readable by the image forming apparatus 30 selected for a remote print job may be PCL3, and a general data type to be transmitted to a server may be PDF. For example, a size of print data generated according to PCL3 may be larger than a size of print data generated according to PDF. In addition, the quality of print data generated according to PCL3 may be higher than that of print data generated according to PDF. The client device 10 may select the type of print data based on the network usage fee, the network transmission speed, and the number of print copies generated based on transmitting print data for a certain document to the server 20.

For example, based on the network usage fee being paid, the client device 10 may select the type of print data as PDF.

For example, based on the network usage fee being free, and the network transmission speed being less than a preset speed, the client device 10 may select the type of print data as PDF. For example, based on the network transmission speed being less than 100 Mbp, the client device 10 may select a data type having a small data size. The client device 10 may select the type of print data as PDF.

For example, based on the network usage fee being free, and the network transmission speed being greater than a preset speed, the client device 10 may select the type of print data as PDF. For example, based on the network transmission speed being greater than 100 Mbp, the client device 10 may select a data type having high print quality. The client device 10 may select the type of print data as PCL3.

For example, based on the network usage fee being free, the network transmission speed being greater than a preset speed, and the number of print copies being plural, the client device 10 may select the type of print data as PDF. For example, even if the network transmission speed is greater than 100 Mbp, based on the number of print copies being plural, the size of the print data may become large, the client device 10 may select a data type having a small data size. The client device 10 may select the type of print data as PDF.

However, the process of detecting the data type described with reference to FIG. 11 is an example, and the client device 10 may detect the data type according to another process.

Figure 12:
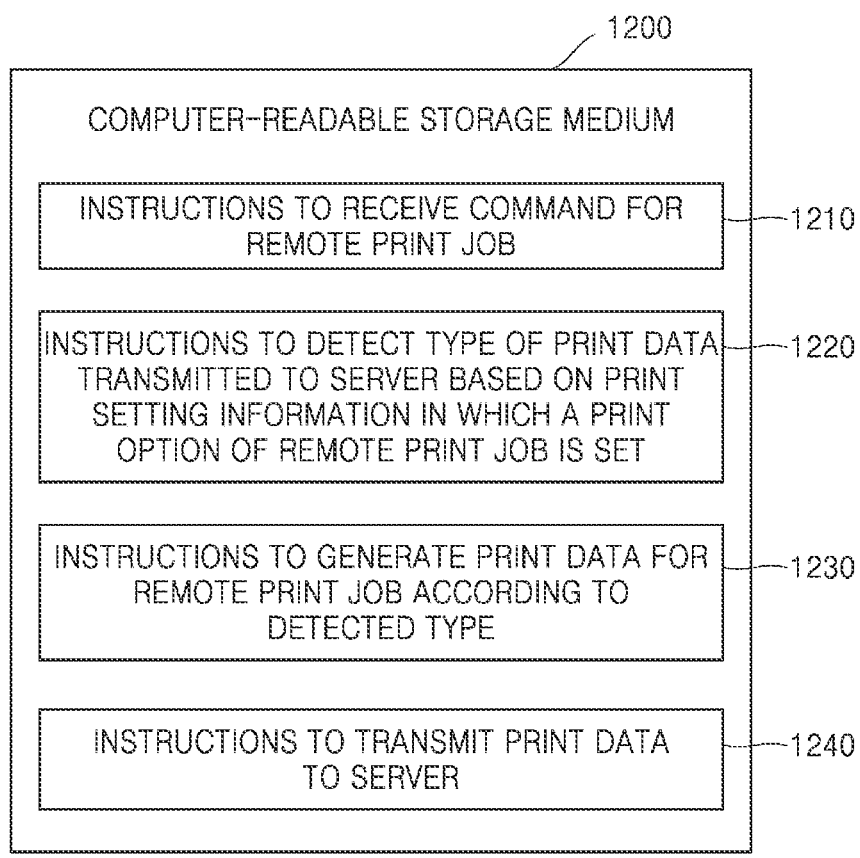
FIG. 12 is a view illustrating instructions stored in a non-transitory computer-readable storage medium according to an example.

FIG. 12 is a view illustrating instructions stored in a non-transitory computer-readable storage medium according to an example.

Based on performing remote printing through the server 20, a non-transitory computer-readable storage medium 1200 may store instructions for an operating method of the client device 10 that detects a data type to be transmitted to the server 20 based on print setting information, generates print data according to the detected type, and transmits the print data to the server 20.

The client device 10 may store instructions 1210 to receive a command for a remote print job, instructions 1220 to detect the type of print data to be transmitted to the server 20 based on print setting information in which a print option of the remote print job is set, instructions 1230 to generate print data for the remote print job according to the detected type, and instructions 1240 to transmit the print data to the server 20.

The above described example operations of the client device 10 may be implemented in the form of a non-transitory computer-readable storage medium storing instructions or data executable by a computer or a processor. The examples may be written as computer programs and may be implemented in general-use digital computers that execute programs using the computer-readable storage medium. The computer-readable storage medium may include read-only memory (ROM), random access memory (RAM), flash memory, CD-ROMs, CD-Rs, CD+Rs, CD-DVD-Rs, DVD-Rs, DVD-RWs, DVD+RW, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing machine readable instructions, associated data, data files, and data structures, and providing the machine readable instructions, associated data, data files, and data structures to a processor or a computer such that the processor or computer may execute the instructions.

Although examples have been described with reference to the accompanying drawings, various changes and modifications may be made therein. For example, the relevant results may be achieved in a situation in which the described technologies are performed in a different order than the described methods, and/or in a situation in which the described elements such as systems, structures, devices, and circuits are coupled or combined in a different form than the described methods or are replaced or substituted by other elements or equivalents.

The examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A client device comprising:
a communication unit;
a user interface unit;
a processor; and
a memory to store instructions executable by the processor,
wherein the processor, by executing the instructions, is to:
receive a command for a remote print job that includes print setting information based on a print option selected through the user interface unit,
select a data type for print data to be transmitted to a server based on the print setting information, a detected network transmission speed, and information about an image forming apparatus,
generate the print data for the remote print job according to the selected data type, and
transmit the print data to the server via the communication unit.

2. The client device of claim 1, wherein the processor, by executing the instructions, is to select the data type of print data to be transmitted to the server based on a number of print copies.

3. The client device of claim 2, wherein the processor, by executing the instructions, is to:
select the data type of print data to be a type that generates a preset small amount of data in a case where the number of print copies is plural, and
select the data type of print data to be a type corresponding to a preset high quality in a case where the number of print copies is singular.

4. The client device of claim 2, wherein the processor, by executing the instructions, is to generate print data in a type that generates a preset small amount of data for a first number of print copies of the remote print job in a case where the number of print copies is plural.

5. The client device of claim 1, wherein the data type of print data to be transmitted to the server is at least one of PDF, PS, PCL, PCLm, or XPS.

6. The client device of claim 1, wherein the processor, by executing the instructions, is to:
calculate a data size of the remote print job based on the print setting information, and
select the data type of print data to be transmitted to the server based on the data size of the remote print job.

7. The client device of claim 1, wherein the processor, by executing the instructions, is to:
obtain network information including at least one of the network transmission speed of a network to which the client device is connected or cost information of the network, and
select the data type of print data to be transmitted to the server based on the network information and the print setting information.

8. The client device of claim 7, wherein the processor, by executing the instructions, is to:
select the data type of print data to be transmitted to the server to be a high quality type in a case where the network transmission speed is greater than a preset speed or a print job data size is smaller than a preset size, and
select the data type of print data to be transmitted to the server to be a type that generates a preset small amount of data in a case where the transmission speed of the network is lower than a preset speed, a usage fee of the network is paid, or the print job data size is larger than a preset size.

9. The client device of claim 1, wherein the processor, by executing the instructions, is to:
receive, through the user interface unit, an input for selecting an image forming apparatus from among a plurality of image forming apparatuses,
obtain, through the communication unit, information about an image forming apparatus including information about the type of print data supported by the image forming apparatus, from the server, and store information about the image forming apparatus in the memory.

10. The client device of claim 1, wherein the processor, by executing the instructions, is to:

receive, through the user interface unit, an input for setting a priority for at least one of a size of the print data or a print quality, and select the data type of print data to be transmitted to the server based on the set priority.

11. An operation method of a client device, the operation method comprising:

receiving a command for a remote print job that includes print setting information based on a print option selected;

selecting a data type for print data to be transmitted to a server based on the print setting information, a detected network transmission speed, and information about an image forming device;

generating the print data for the remote print job according to the selected data type; and transmitting the print data to the server.

12. The operation method of claim 11, wherein the selecting of the data type of print data to be transmitted to the server based on the print setting information comprises selecting of the data type of print data to be transmitted to the server based on a number of print copies included in the print option.

13. A non-transitory computer-readable storage medium storing instructions executable by a processor, the computer-readable storage medium comprising:

instructions to receive a command for a remote print job that includes print setting information based on a print option selected;

instructions to select a data type for print data to be transmitted to a server based on the print setting information, a detected network transmission speed, and information about an image forming apparatus;

instructions to generate the print data for the remote print job according to the selected data type; and instructions to transmit the print data to the server.

* * * * *